(12) United States Patent
Faruque et al.

(10) Patent No.: US 11,220,230 B1
(45) Date of Patent: Jan. 11, 2022

(54) BOWL-SHAPED DRIVER AIRBAG

(71) Applicant: Ford Global Technologies, LLC, Dearborn, MI (US)

(72) Inventors: Mohammad Omar Faruque, Ann Arbor, MI (US); S.M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/907,672

(22) Filed: Jun. 22, 2020

(51) Int. Cl.
*B60R 21/203* (2006.01)
*B60R 21/2338* (2011.01)

(52) U.S. Cl.
CPC ........ *B60R 21/203* (2013.01); *B60R 21/2338* (2013.01); *B60R 2021/23382* (2013.01); *B60R 2021/23386* (2013.01)

(58) Field of Classification Search
CPC .............. B60R 21/203; B60R 21/2338; B60R 2021/23386; B60R 2021/23382
See application file for complete search history.

(56) References Cited

U.S. PATENT DOCUMENTS

| 5,253,892 | A | * | 10/1993 | Satoh | B60R 21/233 |
| | | | | | 280/731 |
| 5,348,340 | A | | 9/1994 | Humphreys et al. | |
| 5,358,273 | A | * | 10/1994 | Onishi | B60R 21/233 |
| | | | | | 280/729 |
| 9,550,465 | B1 | | 1/2017 | El-Jawahri et al. | |
| 9,676,355 | B2 | | 6/2017 | Kruse | |
| 2005/0121889 | A1 | | 6/2005 | Enders et al. | |
| 2006/0232050 | A1 | | 10/2006 | Kumagai et al. | |
| 2008/0048420 | A1 | | 2/2008 | Washino | |
| 2010/0229674 | A1 | | 9/2010 | Tanaka | |
| 2017/0072891 | A1 | * | 3/2017 | Paxton | B60R 21/203 |
| 2017/0267204 | A1 | | 9/2017 | Farooq et al. | |
| 2017/0355341 | A1 | | 12/2017 | Keyser et al. | |
| 2018/0086298 | A1 | | 3/2018 | Nakanishi et al. | |
| 2018/0215339 | A1 | | 8/2018 | Nakanishi et al. | |
| 2018/0297550 | A1 | | 10/2018 | Kitagawa | |
| 2021/0094498 | A1 | * | 4/2021 | Takahashi | B60R 21/2338 |

* cited by examiner

*Primary Examiner* — Drew J Brown
(74) *Attorney, Agent, or Firm* — Frank A. MacKenzie; Bejin Bieneman PLC

(57) ABSTRACT

An assembly for a vehicle includes an instrument panel. The assembly includes a steering wheel having a hub and a rim spaced from and supported by the hub, and an airbag supported by the hub and inflatable to an inflated position. The airbag in the inflated position has a rear panel extending from the hub to the instrument panel. The rear panel has a bowl shape that extends endlessly around the rim.

19 Claims, 5 Drawing Sheets

BOWL-SHAPED DRIVER AIRBAG

BACKGROUND

Vehicles are equipped with airbags. In certain impacts, an inflator activates and provides inflation medium to the airbags, and the airbags pressurize and provide protection to an occupant. The airbags are located at various fixed positions in passenger cabins of vehicles. Vehicles typically include the driver airbag mounted in the steering wheel. Upon inflation, a rim of the steering wheel may act as a reaction surface for the driver airbag.

DETAILED DESCRIPTION

Figure 1:
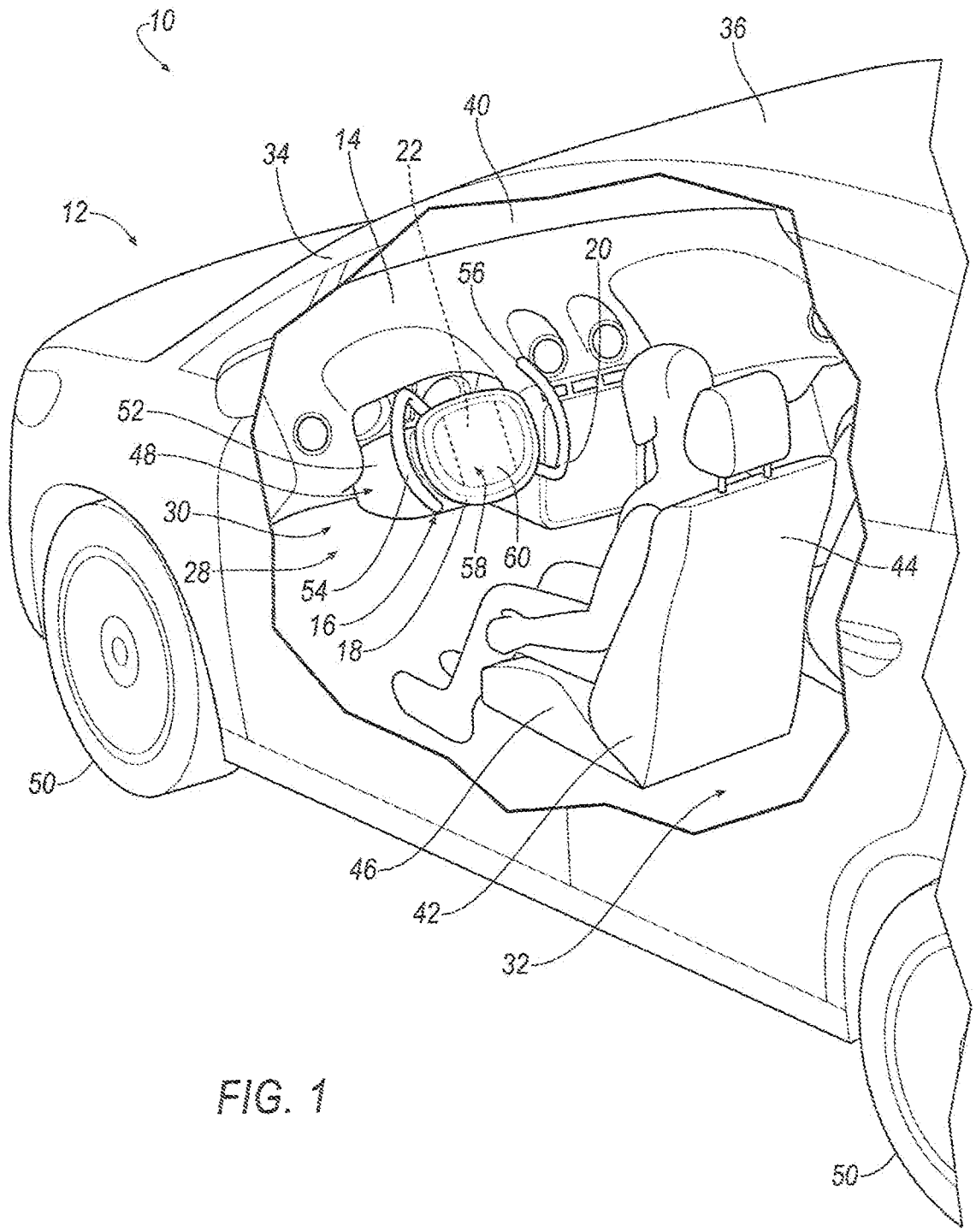
FIG. 1 is a perspective view of a vehicle with a steering wheel and an airbag assembly supported by the steering wheel and in an uninflated position.

An assembly includes an instrument panel, a steering wheel having a hub and a rim spaced from and supported by the hub, and an airbag supported by the hub and inflatable to an inflated position. The airbag in the inflated position having a rear panel extending from the hub to the instrument panel. The rear panel having a bowl shape that extends endlessly around the rim.

The rear panel may define a cavity and the rim may be in the cavity in the inflated position.

The cavity may expand from the hub to the instrument panel.

The rear panel may be spaced from the rim in the inflated position.

The airbag may have a lip abutting the instrument panel. The rear panel may extend from the hub to the lip. The airbag may include external tethers extending from the hub to the lip.

The airbag may include a front panel extending from the lip. The front panel may include a depression opposite the rear panel.

The airbag may include internal tethers connected to the depression and to the rear panel.

The rear panel may include a concave portion and the internal tethers may be connected to the concave portion of the rear panel.

The airbag may include a front panel extending from the lip. The front panel may include a depression opposite the rear panel.

The airbag may include internal tethers connected to the depression and to the rear panel.

The rear panel may include a concave portion and the internal tethers may be connected to the concave portion of the rear panel.

The rear panel may define a cavity and the airbag may include a front panel defining a depression opposite the cavity.

The airbag may include internal tethers connected to the depression and to the rear panel.

The rear panel may include a concave portion and the internal tethers may be connected to the concave portion of the rear panel.

The steering wheel may be a non-circular steering wheel.

With reference to the Figures, wherein like numerals indicate like parts throughout the several views, an assembly 10 for a vehicle 12 is generally shown. The assembly 10 includes an instrument panel 14, a steering wheel 16 having a hub 18 and a rim 20 spaced from and supported by the hub 18, and an airbag 22 supported by the hub 18 and inflatable to an inflated position. The airbag 22 in the inflated position has a rear panel 24 extending from the hub 18 to the instrument panel 14. The rear panel 24 has a bowl shape that extends endlessly around the rim 20.

The bowl shape of the rear panel 24 extending endlessly around the rim 20 and the extension of the rear panel 24 from the hub 18 of the steering wheel 16 to the instrument panel 14 allows the airbag 22 to use the instrument panel 14 as a reaction surface to control the kinematics of a driver during impact of the driver against the airbag 22. During a vehicle impact in which the driver is urged in a direction toward the instrument panel 14, the airbag 22 is inflated to an inflated position and the driver contacts the airbag 22 during movement toward the instrument panel 14. As the driver continues to move toward the instrument panel 14, the airbag 22 is pushed against the instrument panel 14 and uses the instrument panel 14 as a reaction surface to control the kinematics of the driver. Since the airbag 22 can use the instrument panel 14 as the reaction surface, the airbag 22 may be used, as an example, with a non-circular steering wheel, as discussed below.

Figure 2:
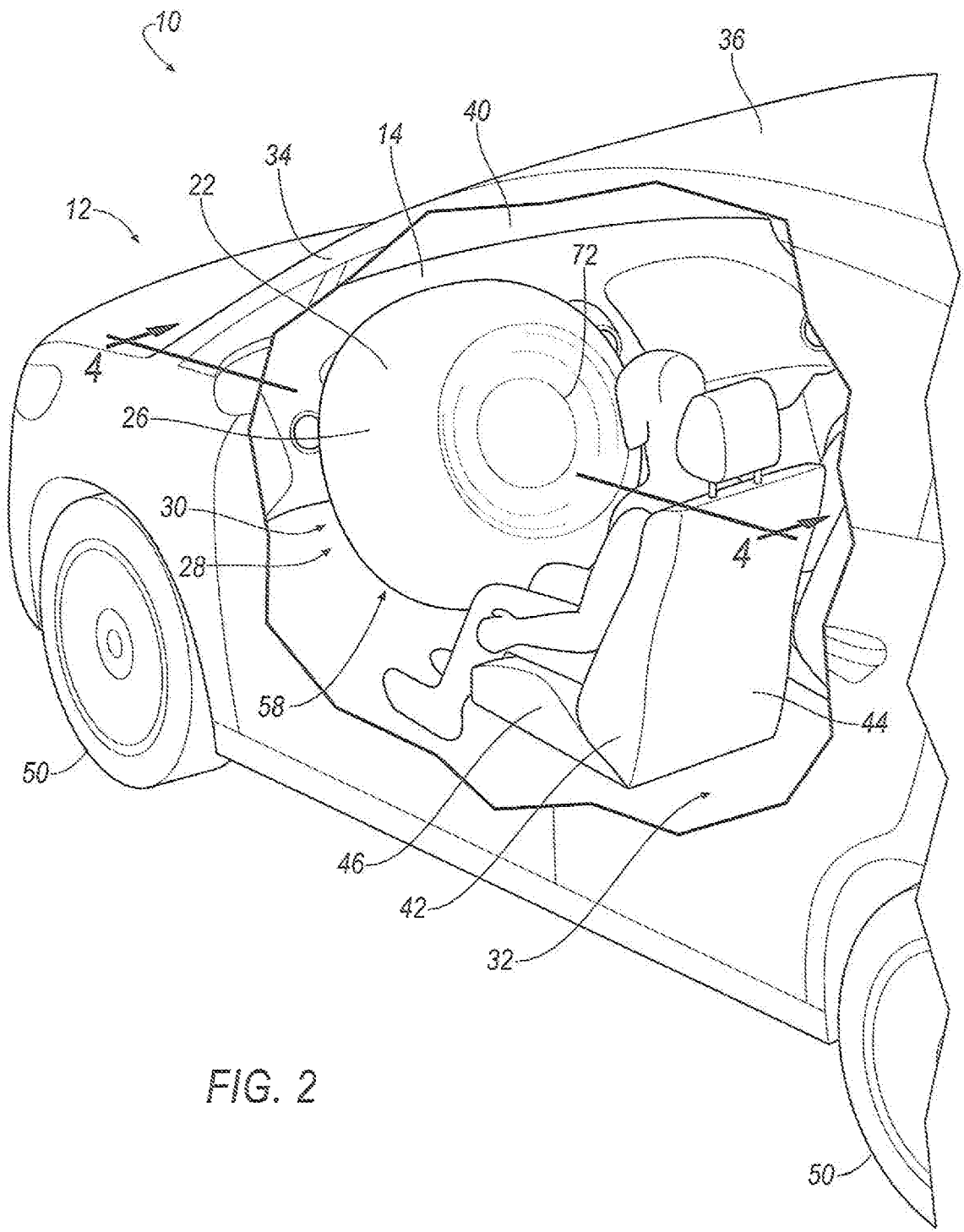
FIG. 2 is a perspective view of the vehicle with an airbag in the inflated position.

With reference to FIGS. 1 and 2, the vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle. The vehicle 12 may have a computer that may control the operations of the vehicle 12 in an autonomous mode, a semi-autonomous mode, and/or a non-autonomous mode. An autonomous mode is defined as one in which each of vehicle propulsion, braking, and steering are controlled by the computer; in a semi-autonomous mode the computer controls one or two of propulsion, braking, and steering of the vehicle 12; in a non-autonomous mode, the driver controls the vehicle propulsion, braking, and steering.

The vehicle 12 includes a passenger cabin 28 to house occupants, if any, of the vehicle 12. The passenger cabin 28 may extend across the vehicle 12, i.e., from one side to the other side of the vehicle 12. The passenger cabin 28 includes a front end 30 and a rear end 32 with the front end 30 being in front of the rear end 32 during forward movement of the vehicle 12.

The vehicle 12 includes an instrument panel 14. The instrument panel 14 is disposed at the front end 30 of the passenger cabin 28. The instrument panel 14 may include vehicle controls and/or entertainment features.

With continued reference to FIGS. 1 and 2, the instrument panel 14 may extend across the front end 30 of the passenger cabin 28 from one side of the vehicle 12 to the other side of the vehicle 12, i.e., across the passenger cabin 28 in a cross-vehicle direction. For example, the instrument panel 14 may extend from a front pillar 34 to another front pillar 34. Specifically, the front pillars 34 may extend from a roof 36 to the instrument panel 14. The instrument panel 14 may, for example, be fixed to a bulkhead 38 of the vehicle 12 that separates the passenger cabin 28 from an engine compartment of the vehicle 12.

The vehicle 12 may include a windshield 40 disposed at the front end 30 of the passenger cabin 28. The windshield 40 may extend from one side of the vehicle 12 to the other side of the vehicle 12. Specifically, the windshield 40 may extend from the front pillar 34 to another front pillar 34. The windshield 40 may extend from the roof 36 to the instrument panel 14. The windshield 40 may face in toward the front end 30 of the passenger cabin 28. The windshield 40 may be any suitably transparent material, including glass such as laminated, tempered glass or plastic.

The vehicle 12 includes one or more seats 42 in the passenger cabin 28. For example, at least one seat 42 is arranged at the front end 30 of the passenger cabin 28 adjacent the instrument panel 14, i.e., with the lack of anything between the seat 42 and the instrument panel 14. The seat 42 may include a seatback 44 and a seat bottom 46 extending from the seatback 44 toward the instrument panel 14. The seat 42 may include a seatbelt assembly used to retrain the occupant relative to the seat 42, e.g., in the event of an impact. As another example, the seat 42 may not include a seatbelt, i.e., is seatbelt-less. In such an example, the occupant is unrestrained relative to the seat 42 during normal operation of the vehicle 12 and passive restraints, e.g., the airbag 22, controls the kinematics of the occupant during an impact. In the figures, the seat 42 is shown as a bucket seat, an in other examples the seats 42 may be other types. The position and orientation of the seats 42 and components thereof may be adjustable by the occupant.

The vehicle 12 includes a steering system 48. The steering system 48 includes the steering wheel 16. The steering system 48 controls the turning of wheels 50 of the vehicle 12 on the ground to steer the vehicle 12. Components of the steering system 48 are in communication with and receive input from the steering wheel 16. The steering system 48 may include a rack-and-pinion system with electric power-assisted steering, a steer-by-wire system, as are both known in the art, or any other suitable system. The steering system 48 may include a steering column 52 supporting the steering wheel 16 on the instrument panel 14. The steering system 48 may include a steering shaft in the steering column 52 and in communication with the steering wheel 16 to transfer rotation of the steering wheel 16, e.g., to movement of a steering rack.

Figure 3:
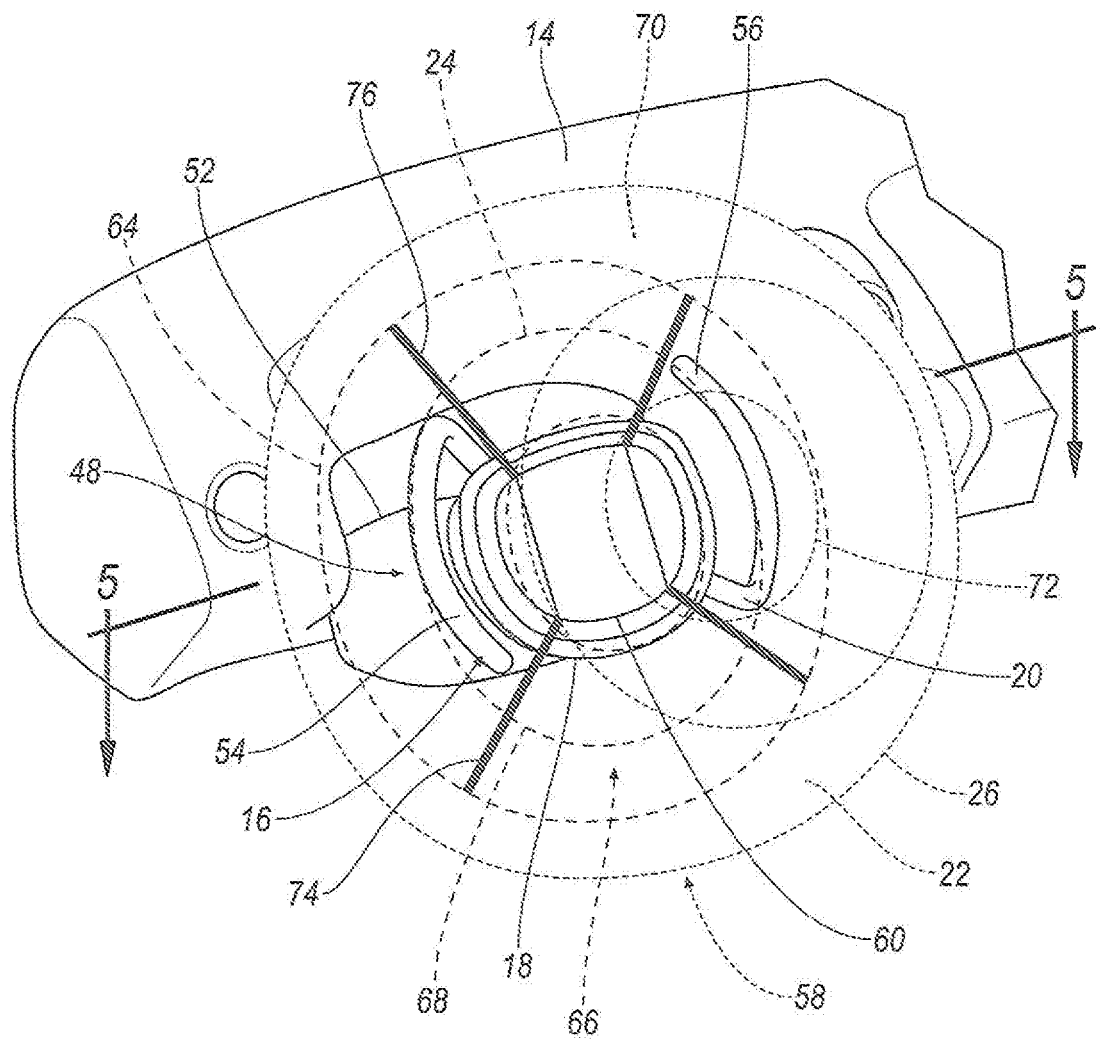
FIG. 3 is a perspective view an instrument panel, the steering wheel, and the airbag in the inflated position with a panel of the airbag in broken lines.

With reference to FIGS. 1-3, as set forth above, the vehicle 12 includes the steering wheel 16. The steering wheel 16 allows the driver to steer the vehicle 12 by transmitting rotation of the steering wheel 16 to steer the wheels 50. The steering wheel 16 includes the hub 18 and the rim 20.

The hub 18 may be located centrally on the steering wheel 16. The steering wheel 16 is rotatable about a rotational axis. The rotational axis extends through the hub 18. The rotational axis may extend along the steering column 52. Specifically, the rotational axis generally extends in a vehicle fore-aft direction. As the driver rotates the steering wheel 16 to turn the vehicle 12, the hub 18 rotates about the rotational axis.

The rim 20 is supported by the hub 18. The rim 20 may be spaced from the hub 18. Specifically, the rim 20 includes an outer segment 54 spaced radially from the hub 18 with a space between the outer segment 54 and the hub 18 so that the outer segment 54 may be gripped by the driver.

The steering wheel 16 may be a non-circular steering wheel. Specifically, the rim 20 may be non-circular circumferentially about the hub 18. As one example, the rim 20 may be longer in one direction than another. As another example in which the rim 20 is non-circular, the rim 20 may include at least two paddles 56 that are discontinuous relative to each other about the hub 18 and spaced from the hub 18 in a cross-vehicle direction when the steering wheel 16 is steered straight. As other examples of the rim 20 being non-circular, the rim 20 may be endless and be, e.g., oval, rectangular, rounded rectangular etc. In other examples the rim 20 may be circular, i.e., a ring.

Figure 4:
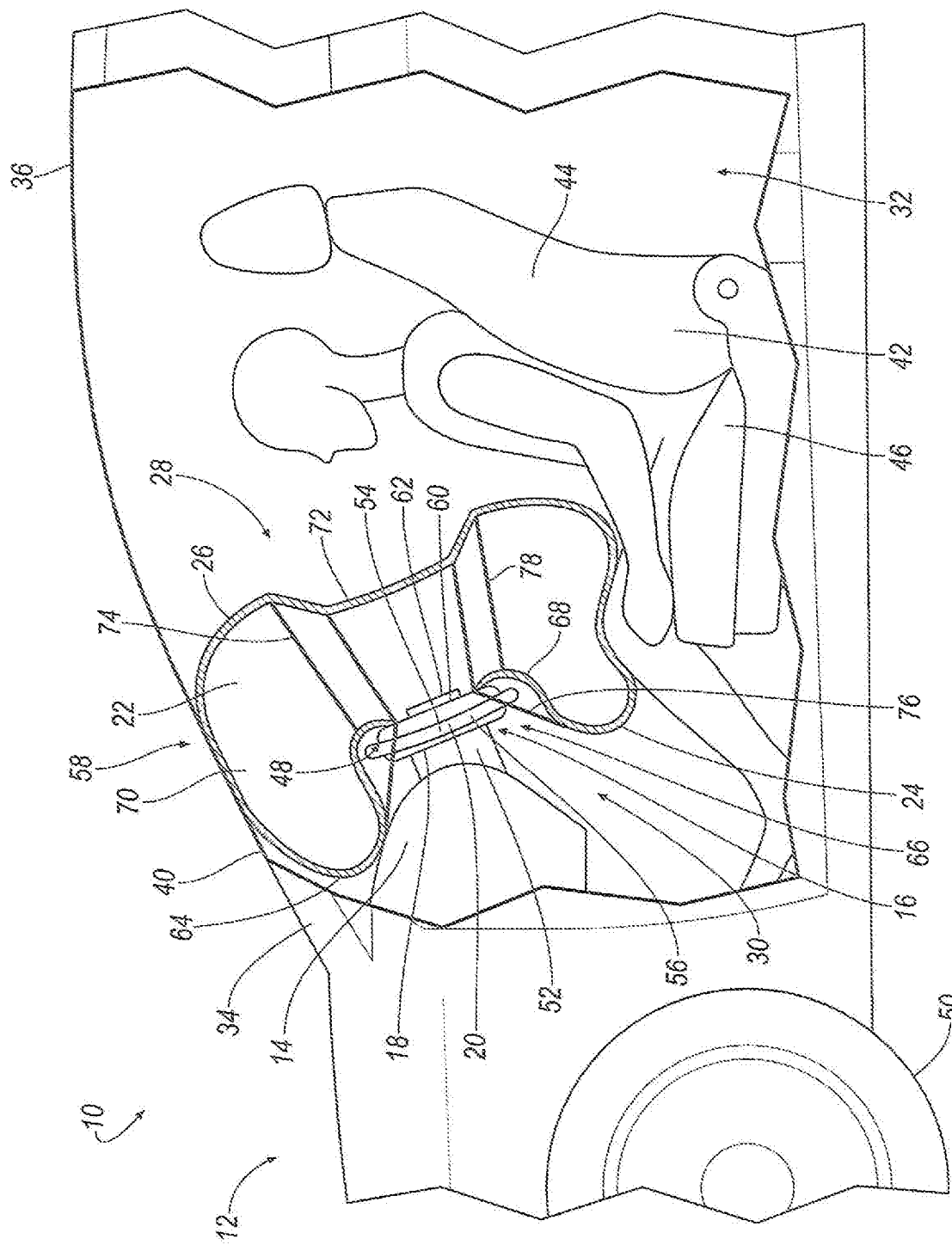
FIG. 4 is a side view of the view of the vehicle with the airbag shown in cross section in the inflated position.
Figure 5:
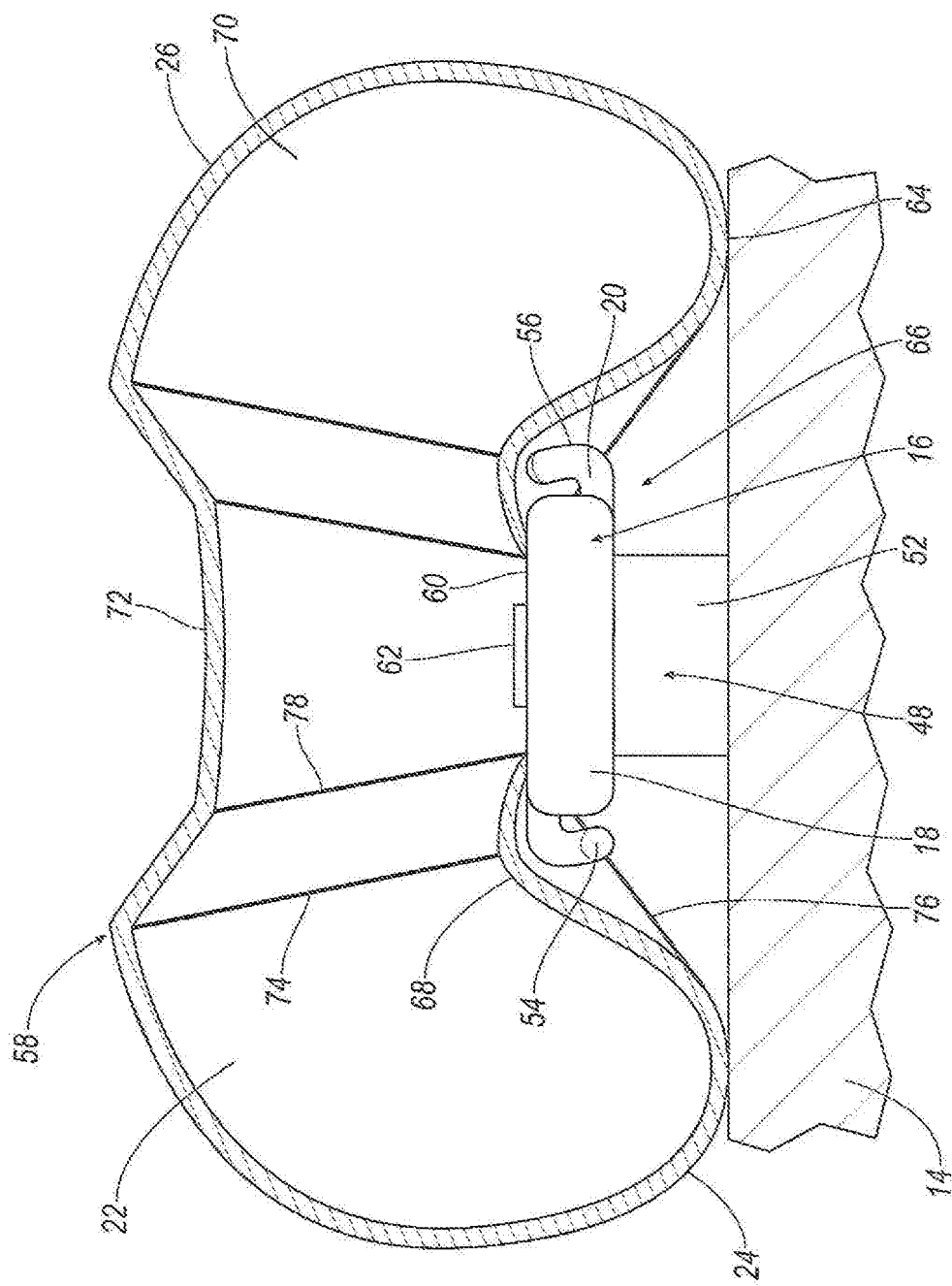
FIG. 5 is a cross-sectional view of the instrument panel, the steering wheel, and the airbag through line 5 in FIG. 3.

With reference to FIGS. 3-5, the vehicle 12 includes an airbag assembly 58. The airbag assembly 58 may include an airbag housing 60, an inflator 62, and the airbag 22. The airbag 22 is supported by the hub 18, e.g., via the housing 60. The housing 60 houses the airbag in an uninflated position, as shown in FIG. 1, and supports the airbag 22 in an inflated position, as shown in FIG. 2. The airbag 22 may be rolled and/or folded to fit within the housing 60 in the uninflated position. The housing 60 may be of any suitable material, e.g., a rigid polymer, a metal, a composite, or a combination of rigid materials.

With reference to FIGS. 4-5, the inflator 62 is in fluid communication with the airbag 22. The inflator 62 expands the airbag 22 with inflation medium, such as a gas, to move the airbag 22 from the uninflated position to the inflated position. The inflator 62 may be supported by any suitable component. For example, the inflator 62 may be supported by the housing 60. The inflator 62 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 62 may be, for example, at least partially in an inflation chamber 70 to deliver inflation medium directly to the inflation chamber 70 or may be connected to the inflation chamber 70 through fill tubes, diffusers, etc.

The airbag 22 is supported by the hub 18. The airbag 22 may be disposed in the hub 18 in the uninflated position and extends from and remains supported by the hub 18 in the inflated position. The airbag 22 inflates away from the hub 18 toward the driver in a vehicle-rearward direction and extends away from the hub 18 toward the instrument panel 14 in a vehicle-forward direction.

With continued reference to FIGS. 4-5, the airbag 22 includes the rear panel 24 and a front panel 26. The rear panel 24 faces the vehicle-forward direction i.e., is "rear" from the perspective of the driver, and the front panel 26 faces the vehicle-rearward direction. i.e., is the "front" viewed from the perspective of the driver.

The airbag 22 includes a lip 64, as described further below, and the front panel 26 and the rear panel 24 meet at the lip 64. The airbag 22 is bowl-shaped. Specifically, in the inflated position, the front panel 26 is convex from the lip 64 and the rear panel 24 extends from the lip 64 to the housing 60 inside the front panel 26. The front panel 26 and the rear panel 24 extend from the lip 64 in generally the same direction. Specifically, the front panel 26 extends from the lip 64 in a generally vehicle-forward direction and the rear panel 24 extends from the lip 64 to the housing 60 in a generally vehicle-forward direction.

The front panel 26 and the rear panel 24 of the airbag 22 may be unitary, i.e., formed together as a single, uniform piece of material with no seams, joints, fasteners, or adhesives holding it together. As an example, the front panel 26 and the rear panel 24 may be one-piece woven. As another example, the front panel 26 and the rear panel 24 may be formed separately and subsequently assembled, e.g., by threaded engagement, ultrasonic welding, fusing, etc. The lip 64 may be unitary with front panel 26 and the rear panel 24. The lip 64 is the meeting line between the front panel 26 and the rear panel 24 from which the front panel 26 and the rear panel 24 extend vehicle-forward.

The airbag 22, including the front panel 26 and the rear panel 24, may be a woven polymer or any other material. As one example, the airbag 22 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

With reference to FIGS. 3-5, as set forth above, the rear panel 24 has a bowl shape when the airbag 22 is in the inflated position. Specifically, the rear panel 24 is cupped from the housing 60 to the instrument panel 14.

The rear panel 24 extends endlessly around the rim 20 of the steering wheel 16 in the inflated position. Specifically, the bowl shape extends endlessly around the rim 20. In other words, the rear panel 24 extends from the hub 18 to the instrument panel 14 360 degrees about the rotational axis of the steering wheel 16 with the rim 20 disposed between the rear panel 24 and the rotational axis. As an example, the bowl shape may be a partial hemisphere. The lip 64 of the airbag 22 extends endlessly about the rotational axis.

The rear panel 24 defines a cavity 66 in the inflated position. Specifically, the bowl shape of the airbag 22 defines the cavity 66. The rim 20 of the steering wheel 16 is in the cavity 66 when the airbag 22 is in the inflated position. In other words, the bowl shape of the rear panel 24 cups around the rim 20 of the steering wheel 16.

The lip 64 of the airbag 22 abuts the instrument panel 14 in the inflated position. Specifically, at least a portion of the lip 64 abuts the instrument panel 14 in the inflated position and other portions of the lip 64 may not contact the instrument panel 14 when the instrument panel 14 is in the inflated position.

With reference to FIG. 5, the rim 20 of the steering wheel 16 may be spaced from, i.e., not in contact with, the rear panel 24 of the airbag 22 when the airbag 22 is in the inflated position. For example, when the lip 64 abuts the instrument panel 14, the contact of the lip 64 with the instrument panel 14 may cause the rear panel 24 to bow away from the rim 20.

With reference to FIGS. 4-5, the cavity 66 may expand from the hub 18 to the instrument panel 14. Specifically, the cavity 66 of the airbag 22 may expand from the housing 60 to the instrument panel 14. In such examples, the bowl shape of the rear panel 24 expands from the housing 60 to the instrument panel 14.

As set forth above, the rear panel 24 extends from the hub 18 to the instrument panel 14. The rear panel 24 contacts the instrument panel 14 at the lip 64. By contacting the instrument panel 14 at the lip 64, the airbag 22 uses the instrument panel 14 as a reaction surface. This may limit or eliminate the operation of the rim 20 of the steering wheel 16 as a reaction surface for the airbag 22. As set forth above, this may be beneficial, as an example, in examples in which the steering wheel 16 is non-circular and thus does not have the size and/or shape to act as a reaction surface for the airbag 22.

With continued reference to FIGS. 4-5, the rear panel 24 may have a concave portion 68. The concave portion 68 is located at the peak of the cavity 66 in the vehicle-rearward direction. The concave portion 68 may be maintained by internal tethers 78 as set forth below. The rear panel 24 extends from the hub 18 the concave portion 68 in the vehicle-rearward direction and extends from the concave portion 68 to the lip 64 in the vehicle-forward direction.

The front panel 26 is opposite the rear panel 24 with the inflation chamber 70 of the airbag 22 between the front panel 26 and the rear panel 24. During an impact in which the driver is urged in a direction toward the instrument panel 14 the driver contacts the front panel 26 during movement toward the instrument panel 14. As the driver continues to move toward the instrument panel 14 the front panel 26 is pushed in a vehicle-forward direction and causes the airbag 22 to be pushed against the instrument panel 14.

With reference to FIGS. 3-5, the front panel 26 extends endlessly about the rotational axis at the lip 64. The front panel 26 has a convex shape from the lip 64 in the vehicle-rearward direction in the inflated position.

With reference to FIG. 4, the front panel 26 may abut the windshield 40 in the inflated position. In such an example, the front panel 26 uses the windshield 40 as a reaction surface. Such an example adds the windshield 40 as another reaction surface for the airbag 22 in addition to the contact between the lip 64 and the instrument panel 14. This may be beneficial in examples in which the steering wheel 16 is non-circular and thus does not have the size and/or shape to act as a reaction surface for the airbag 22.

With reference to FIGS. 3-5, the front panel 26 may include a depression 72. The depression 72 may be located centrally relative to the front panel 26 to catch the head of the driver during a vehicle impact that causes the occupant to move in a cross-vehicle direction such as a frontal or oblique vehicle impact. The depression 72 may be designed to keep the head of the driver from slipping off the side of the airbag 22 during the vehicle impact. In an example, the depression 72 may be a sunken flat area or may be concave. The depression 72 may be maintained by internal tethers 78 as set forth below With reference to FIGS. 3-5, the airbag 22 may include tethers 74. The tethers 74 may be of the same material as the front panel 26 and the rear panel 24 or may be of a different type of material. The tethers 74 control and maintain a shape of the airbag 22 in the inflated position. For example, the tethers 74 maintain the bowl shape of the rear panel 24 and the depression 72 of the front panel 26.

The tethers 74 may include external tethers 76. The external tethers 76 are external to the inflation chamber 70. The external tethers 76 extend from the hub 18 to the lip 64. Specifically, the external tethers 76 are connected to the hub 18 at one end of the external tether and to the lip 64 at the other end of the external tether. The tension created by the external tethers 76 between the lip 64 and the hub 18 when the airbag 22 is in the inflated position maintains the cavity 66.

The tethers 74 may include a plurality of internal tethers 78. The internal tethers 78 are internal to the inflation chamber 70. The internal tethers 78 are connected to the depression 72 and to the rear panel 24. Specifically, the internal tethers 78 are connected to the depression 72 in the front panel 26 on one end and to the rear panel 24 on the other end.

The plurality of internal tethers 78 may be connected to the concave portion 68 of the rear panel 24. The plurality of internal tethers 78 may be connected to the concave portion 68 on one and end of the internal tether and to the depression 72 on the other end of the tether. The tension created by the internal tethers 78 between the concave portion 68 and the depression 72 when the airbag 22 is in the inflated position maintain the concave portion 68 and depression 72. During a vehicle impact as set forth above, the airbag 22 is inflated to the inflated position. When in the inflated position the rear panel 24 extends from the hub 18 to the instrument panel 14 and has a bowl shape that extends around the rim 20 of the steering wheel 16. The rear panel 24 contacts the instrument panel 14 at the lip 64. By contacting the instrument panel 14 at the lip 64, the airbag 22 uses the instrument panel 14 as a reaction surface. As shown in FIG. 4, the airbag 22 may also use the windshield 40 as a reaction surface. The use of the instrument panel 14 may limit or eliminate the operation of the rim 20 of the steering wheel 16 as a reaction surface for the airbag 22. The bowl shape of the rear panel 24 is maintained by the external tethers 76. The cavity 66 created by the bowl shape of the rear panel 24 may limit or eliminate the operation of the rim 20 of the steering wheel 16 as a reaction surface for the airbag 22. As set forth above, this may be beneficial, as an example, in examples in which the steering wheel 16 is non-circular and thus does not have the size and/or shape to act as a reaction surface for the airbag 22. The depression 72 is maintained by the internal tethers 78 may keep the head of the driver from slipping off the side of the airbag 22 during an impact.

The vehicle 12 may include an impact sensor. The impact sensor is programmed to detect an impact to the vehicle 12. The impact sensor may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 82 may be located at numerous points in or on the vehicle 12.

The vehicle 12 may include a communication network. The communication network includes hardware, such as a communication bus, for facilitating communication among vehicle components. The communication network may facilitate wired or wireless communication among the vehicle components in accordance with a number of communication protocols such as controller area network (CAN), Ethernet, WiFi, Local Interconnect Network (LIN), and/or other wired or wireless mechanisms.

The vehicle 12 may include a computer. The computer may be a microprocessor-based computing device implemented via circuits, chips, or other electronic components. For example, the computer may include a processor, memory, etc. The memory of the computer may store instructions executable by the processor as well as data and/or databases. The processor is programmed to initiate an inflation of the airbag 22 in response to a vehicle impact. Specifically, the processor is programmed to activate the inflator 62 in response to a vehicle impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   an instrument panel;
   a steering wheel having a hub and a rim spaced from and supported by the hub; and
   an airbag supported by the hub and inflatable to an inflated position, the airbag in the inflated position having a rear panel extending from the hub to the instrument panel, the rear panel having a bowl shape that extends endlessly around the rim;
   the airbag having a lip abutting the instrument panel, the rear panel extending from the hub to the lip, and the airbag including external tethers extending from the hub to the lip.

2. The assembly of claim 1, wherein the rear panel defines a cavity and the rim is in the cavity in the inflated position.

3. The assembly of claim 2, wherein the cavity expands from the hub to the instrument panel.

4. The assembly of claim 1, wherein the rear panel is spaced from the rim in the inflated position.

5. The assembly of claim 1, wherein the airbag includes a front panel extending from the lip, the front panel including a depression opposite the rear panel.

6. The assembly of claim 5, wherein the airbag includes internal tethers connected to the depression and to the rear panel.

7. The assembly of claim 6, wherein the rear panel includes a concave portion and the internal tethers are connected to the concave portion of the rear panel.

8. The assembly of claim 1, wherein the airbag includes a front panel extending from the lip, the front panel including a depression opposite the rear panel.

9. The assembly of claim 8, wherein the airbag includes internal tethers connected to the depression and to the rear panel.

10. The assembly of claim 9, wherein the rear panel includes a concave portion and the internal tethers are connected to the concave portion of the rear panel.

11. The assembly of claim 1, wherein the rear panel defines a cavity and the airbag includes a front panel defining a depression opposite the cavity.

12. The assembly of claim 11, wherein the airbag includes internal tethers connected to the depression and to the rear panel.

13. The assembly of claim 12, wherein the rear panel includes a concave portion and the internal tethers are connected to the concave portion of the rear panel.

14. The assembly of claim 1, wherein the rim is non-circular.

15. An assembly comprising:
    an instrument panel;
    a steering wheel having a hub and a rim spaced from and supported by the hub; and
    an airbag supported by the hub and inflatable to an inflated position, the airbag in the inflated position having a rear panel extending from the hub to the instrument panel, the rear panel having a bowl shape that extends endlessly around the rim;
    the rear panel defining a cavity and the airbag including a front panel defining a depression opposite the cavity;
    the airbag including internal tethers connected to the depression and to the rear panel; and
    the rear panel including a concave portion and the internal tethers being connected to the concave portion of the rear panel.

16. The assembly of claim 15, wherein the cavity expands from the hub to the instrument panel.

17. The assembly of claim 15, wherein the rear panel is spaced from the rim in the inflated position.

18. An assembly comprising:
    an instrument panel;
    a steering wheel having a hub and a rim spaced from and supported by the hub; and
    an airbag supported by the hub and inflatable to an inflated position, the airbag in the inflated position having a rear panel extending from the hub to the instrument panel, the rear panel having a bowl shape that extends endlessly around the rim;

the airbag having a lip abutting the instrument panel;

the airbag including a front panel extending from the lip, the front panel including a depression opposite the rear panel;

the airbag including internal tethers connected to the depression and to the rear panel; and the rear panel including a concave portion and the internal tethers being connected to the concave portion of the rear panel.

19. The assembly of claim 18, wherein the rear panel is spaced from the rim in the inflated position.

* * * * *